(12) United States Patent
Vass et al.

(10) Patent No.: US 7,421,708 B2
(45) Date of Patent: Sep. 2, 2008

(54) PEER-TO-PEER NETWORKING SYSTEM USING INTERCONNECTIVITY FRAMEWORK AND PEER LIBRARY FOR INTERACTING WITH APPLICATIONS

(75) Inventors: Attila Vass, Foster City, CA (US);
Howard Berkey, Foster City, CA (US);
John P. Bates, Foster City, CA (US);
Payton R. White, Foster City, CA (US)

(73) Assignee: Sony Computer Entertainment Inc. (JP)

( * ) Notice: Subject to any disclaimer, the term of this patent is extended or adjusted under 35 U.S.C. 154(b) by 1017 days.

(21) Appl. No.: 10/859,430

(22) Filed: Jun. 1, 2004

(65) Prior Publication Data

US 2004/0255027 A1 Dec. 16, 2004

Related U.S. Application Data

(60) Provisional application No. 60/476,084, filed on Jun. 4, 2003.

(51) Int. Cl.
G06F 9/00 (2006.01)
(52) U.S. Cl. .................. 719/320; 719/328; 719/321
(58) Field of Classification Search ................ 719/328, 719/320, 312, 321, 324, 331, 332; 709/223, 709/328, 26
See application file for complete search history.

(56) References Cited

U.S. PATENT DOCUMENTS 6,446,113 B1 9/2002 Ozzie et al. ................. 709/204
2002/0010771 A1* 1/2002 Mandato .................... 709/223
2002/0083217 A1* 6/2002 Ward et al. .................. 709/328
2002/0147771 A1 10/2002 Traversat et al. ............ 709/203
2004/0122741 A1* 6/2004 Sidman ....................... 705/26
2004/0148611 A1* 7/2004 Manion et al. .............. 719/328

OTHER PUBLICATIONS

Stoica et al., "Chord: A Scalable Peer-to-peer Lookup Service for Internet Applications", pp. 149-160, XP-001115753, Computer Communication Review, Assn. For Computing Machinery, vol. 31, No. 4, Oct. 2001, ISSN: 0146-4833, New York.

(Continued)

Primary Examiner—Le Luu
(74) Attorney, Agent, or Firm—Martine Penilla & Gencarella, LLP (57) ABSTRACT

An interconnectivity framework, method, and system for communicating in a peer-to-peer network is disclosed. A peer of the interconnectivity framework includes a peer library for publishing, messaging and locating component blocks over the peer-to-peer network and a telespace framework for managing component blocks in response to a requirement of an application to be executed at the peer. The component blocks being obtained by the peer library enable execution of the application at the peer in accordance with the requirement. The requirement defines the type of application so that the appropriate component blocks can be obtained from the peer-to-peer network. A networker is further included to enable communication with specific grids of the peer-to-peer network and to enable the publishing, messaging, and locating of objects published by specific peers of a grid of the peer-to-peer network.

30 Claims, 7 Drawing Sheets

OTHER PUBLICATIONS

Li et al., "*Research of Peer-to-Peer Network Architecture*", pp. 312-315, Proceedings of ICCT2003, vol. 1, Apr. 9, 2003, XP010643597, Nat'l High Tech. Dev. 863 Program of China, 2001-AA-11-1-141.

Boggs, Jr., "*Bit-String Resource Allocation Mechanism*", pp. 1667-1669, XP-002299945, NN 76101667, IBM Tech. Disclosure Bulletin, vol. 19, No. 5, Oct. 1, 1976, New York.

Hsiao et al., "*A Tree Model for Structured Peer-to-Peer Protocols*", pp. 336-343, 3rd IEEE/ACM Int'l Symp. on Cluster Computing and the Grid (CCGRID'03), May 12, 2003, XP010639769, IEEE, Dept. of Computer Science, Taiwan.

Hsiao et al., "*Tornado: A Capability Aware Peer-to-Peer Storage Network*", Apr. 22, 2003, pp. 72-79, XP010645600, IEEE Computer Society.

Rhea et al., "*Probabilistic Location and Routing*", pp. 1248-1257, vol. 1 of 3, XP010593691, conf. 21, (Jun. 23, 2002), IEEE Infocom 2002, Conf. On Communications Jun. 23-27, 2002, New York.

\* cited by examiner

PEER-TO-PEER NETWORKING SYSTEM USING INTERCONNECTIVITY FRAMEWORK AND PEER LIBRARY FOR INTERACTING WITH APPLICATIONS

CROSS REFERENCE TO RELATED APPLICATIONS

This application claims priority under 35 U.S.C. § 119(e) to U.S. Provisional Patent Application No. 60/476,084, filed on Jun. 4, 2003 and entitled "Virtual/Real World Dynamic Intercommunication Methods and Systems," which is hereby incorporated by reference in its entirety.

BACKGROUND

1. Field of the Invention

The present invention relates to peer-to-peer networks, and more specifically to a framework infrastructure that enables peers to access data, interact with applications, and navigate through content in a virtual/real world connected environment.

2. Description of the Related Art

A decentralized computing environment is defined by a number of computing systems interconnected to communicate with one another, wherein each computing system can perform both client and server functions. A peer-to-peer (P2P) network represents a decentralized computing environment in which each computing system within the P2P network is defined as a peer of every other computing system within the network. For discussion purposes, each peer computing system within the P2P network is referred to as a node. Additionally, each node within the P2P network is configured to execute software having substantially equivalent functionality. Therefore, each node is enabled to act as both a provider and a user of data and services across the P2P network.

Although peer-to-peer networking has improved over the years and new uses continue to take advantage of such networking, the main functionally of peer-to-peer networking has not experienced much change. It is common for each peer in the network to have one or more applications and those applications communicate with other application of other peers. Some peers provide data to requesting peers and other peers process data for other peers. Such a configuration works, however, the investment needed by each peer to become an active member of the network can be substantial. Peer networking application must be loaded on the peer computers, drivers may need to be installed to access certain applications, and communication with other peers is dictated by the peer protocol of the network to which connection is requested.

In view of the foregoing, there is a need for a framework to enable flexible communication and interfacing with applications and data over a connected peer-to-peer network, which may be defined by one or more grids of peers.

SUMMARY OF THE INVENTION

Broadly speaking, the present invention provides architectures, methods, and computer readable media. The architectures and computer implemented methods define a framework for executing applications in component form over grids of a peer-to-peer network. A telespace frame work is provided to enable applications to define necessary components for executing a particular type of application or to communicate messages. The telespace framework includes a peer library (PeerLib) that enables the communication functionality with peers connected to particular grids of a peer-to-peer network. It should be appreciated that the present invention can be implemented in numerous ways, such as a process, an apparatus, a system, a device or a method on a computer readable medium. Several inventive embodiments of the present invention are described below.

An interconnectivity framework for communicating in a peer-to-peer network is disclosed. A peer of the interconnectivity framework includes a peer library for publishing, messaging and locating component blocks over the peer-to-peer network and a telespace framework for managing component blocks in response to a requirement of an application to be executed at the peer. The component blocks being obtained by the peer library enable execution of the application at the peer in accordance with the requirement.

A networker component for facilitating an application programming interface (API) of a peer in peer-to-peer network is disclosed. The networker component includes a resource manager for publishing resources of the peer to other peers of the peer-to-peer network and for obtaining objects from the other peers of the peer-to-peer network for an application. A grid manager is further included to create or join specific grids of the peer-to-peer network. A dispatcher for receiving messages at the peer from the peer-to-peer network is further included. And, a dynamic overlay objects (DOO) component is provided as part of the networker for creating the specific grids in response to instructions from the grid manager.

A method for executing an application at a peer having a telespace framework that is connected to a peer-to-peer network is disclosed. The method first includes defining a peer library for publishing, messaging and locating component blocks over the peer-to-peer network. Then, the method includes defining a telespace framework for managing component blocks in response to a requirement of an application to be executed at the peer. The component blocks are obtained by the peer library to enable execution of the application at the peer in accordance with the requirement.

A computer readable media including program instructions for executing an application at a peer having a telespace framework that is connected to a peer-to-peer network is disclosed. The computer readable media includes program instructions for defining a peer library for publishing, messaging and locating component blocks over the peer-to-peer network. The computer readable media further includes program instructions for defining a telespace framework for managing component blocks in response to a requirement of an application to be executed at the peer. The component blocks being obtained by the peer library to enable execution of the application at the peer in accordance with the requirement.

An interconnectivity framework for communicating in a peer-to-peer network is provided. A peer of the interconnectivity framework includes a peer library means for publishing, messaging and locating component blocks over the peer-to-peer network. The interconnectivity framework further includes a framework means for managing component blocks in response to a requirement of an application to be executed at the peer. The component blocks are obtained by the peer library means to enable execution of the application at the peer in accordance with the requirement.

Other aspects of the invention will become apparent from the following detailed description, taken in conjunction with the accompanying drawings, illustrating by way of example the principles of the invention.

BRIEF DESCRIPTION OF THE DRAWINGS

Embodiments of the invention may best be understood by reference to the following description taken in conjunction with the accompanying drawings.

DETAILED DESCRIPTION

Figure 1:
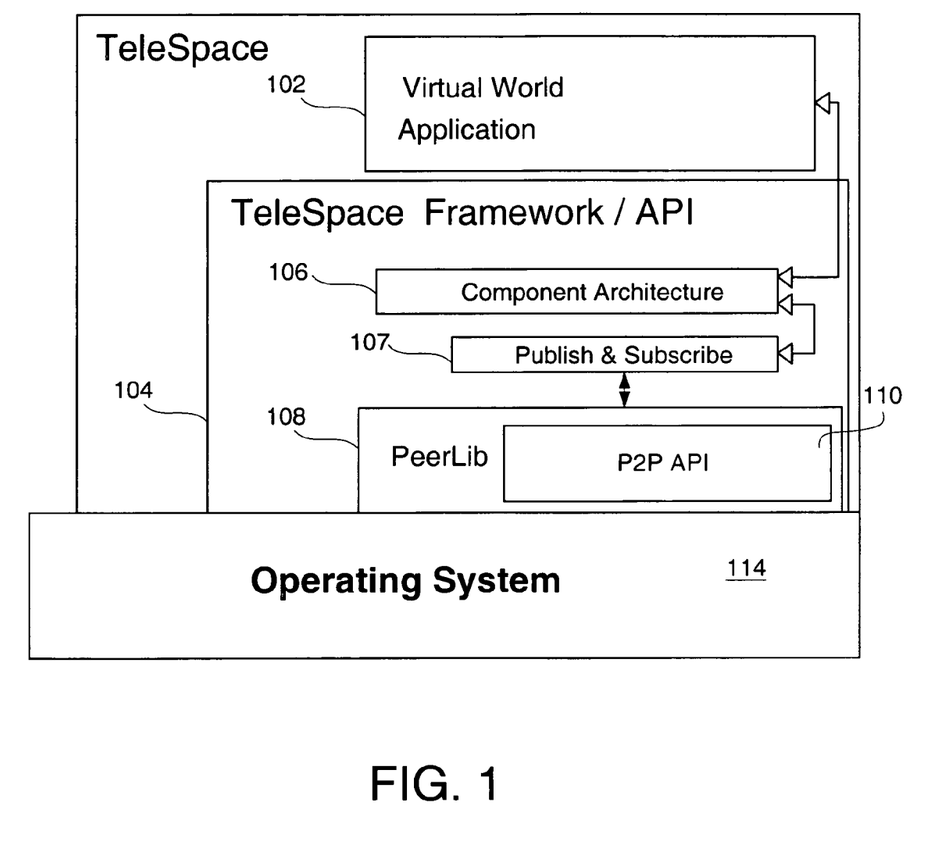
FIG. 1 defines a telespace framework of a peer, in a peer-to-peer network, in accordance with one embodiment of the present invention.

FIG. 1 illustrates telespace component 100, which functions over an operating system 114 of a peer that is part of a peer-to-peer network. In one embodiment, the telespace component 100 may include an application. In this example, the application is a virtual world application 102. A virtual world application 102 is an application that will enable a user to access the computing functionality of any application. The applications can be of any type, and the provided functionality can include interactivity with components and aspects that simulate objects in the real world. For instance, in the real world, people use a multitude of sources to function in normal modem life.

Such sources can include computers, telephones, cellular communication devices, gaming programs, video and audio entertainment, news papers, and person-to-person communication. Depending on the location that the person is in, the real world will offer different experiences and access to interact with particular sources. For instance, the sources available while a person is at the office may be different than the sources available to the person while at home or at a restaurant. Many times, sources, such an audio library of songs, will only be available on the person's home computer, and not at the office. In another example, a person walking down the street may be exposed to a number of sources that are not available at home. Such sources may include, for instance, store fronts, weather conditions, banks, other people, posters, restaurants, automobiles, etc. Thus, as can be appreciated, people tend to function in the real world knowing what sources are available to them, depending on their physical location. A virtual world application 102 attempts to mimic the real world, where the types of sources and exposures to content can be virtually unbound, depending on where the person desires to travel to or interact with.

Consequently, the virtual world application 102 would allow a user to enter an environment, which will provide a menu of potential "interest spaces," and depending on the selection, the options available in the virtual world will be filtered down to a subset. For instance, if the user desires to enter a gaming room, the interest space will include game sessions in progress or available to the user. As part of the interest space, other users that selected same interest space may already be interconnected and able to share information, program components, data and communicate messages with one another. Note that basic peer-to-peer network interconnectivity is referred to throughout this document by many synonyms including "peer to peer overlay", "grid", "network grid" or "grid overlay". Peer-to-peer networking implies a form of network communication where every node has roughly equivalent abilities to send and receive data. Thus, the virtual application 102 is only an example, and when the peer selects to enter an interest space, the network grids in which the peer is part of will change. Based on what the user (i.e., connected peer) wants to do in the interest space, the peer will be able to select other available applications. The applications, as will be described below, can vary significantly. And, applications running on peers operate based on a distributed component architecture.

Inertest space management will perform the filtering, which enables specific grids to be accessed by particular peers. The filtering can be task dependent, priority dependent, entity dependent, interactive/real-time evaluated, data collection and caching, and lazy evaluation and expandable interest zones. Initially, the starting point for a peer can be a "home space," which defines a grid overlay that is most interesting to the peer user. Access to the home space can be subscription based, or can be centrally organized like real life. Local space vs. shared space can also be a determining factor in the filtering, or the filtering can be physical based (i.e., GPS to virtual location mapping).

Thus, an application running on a peer will be defined by components blocks (objects), which are part of a component architecture 106 of the telespace framework 104. The telespace framework 104 will further include a publish and subscribe (P&S) component 107, a peer library (PeerLib) 108 and a P2P API 110 that is part of PeerLib 108. The telespace component 100 of each peer in the peer-to-peer network will thus run over its own operating system 114.

As used herein, the term "telespace" identifies a type of space in which peers of a peer-to-peer network may join, enter, exit, interact in, communicate through, and simply communicate with other peers or groups of peers. Thus, the space of a particular telespace can include particular grids of a defined interest or a number of grids that enable certain peers, which may have joined the particular grid(s), to interact with one another, share data (e.g., file data, component data, audio and/or video data, game data, multimedia data, etc.), share components or objects, and establish linked sessions with one or more peers. Thus, the term "telespace" should be given a broad definition, which should not limit the claims to specific spaces, but provide a context for the described structure and/or functionally.

With the above definition in mind, the Telespace framework API 104, depending on the application will provide different functionality. In the simple example of FIG. 2, the applications can include, as a limited simple example, a connectivity application 102a, a game application 102b, a game application 102c, and the larger encompassing virtual world application 102. With reference to the virtual world application 102, the application that defines the virtual world application 102 will require certain component blocks to define the application. The component blocks are managed by the component architecture 106 of the telespace framework API. The component blocks of the component architecture 106 are objects that define a wrapper around data and/or methods. As used in this application, objects and component blocks will be used interchangeably. However, some objects may consist of more than one component block. These aggregated blocks are referred to as entities.

Figure 2:
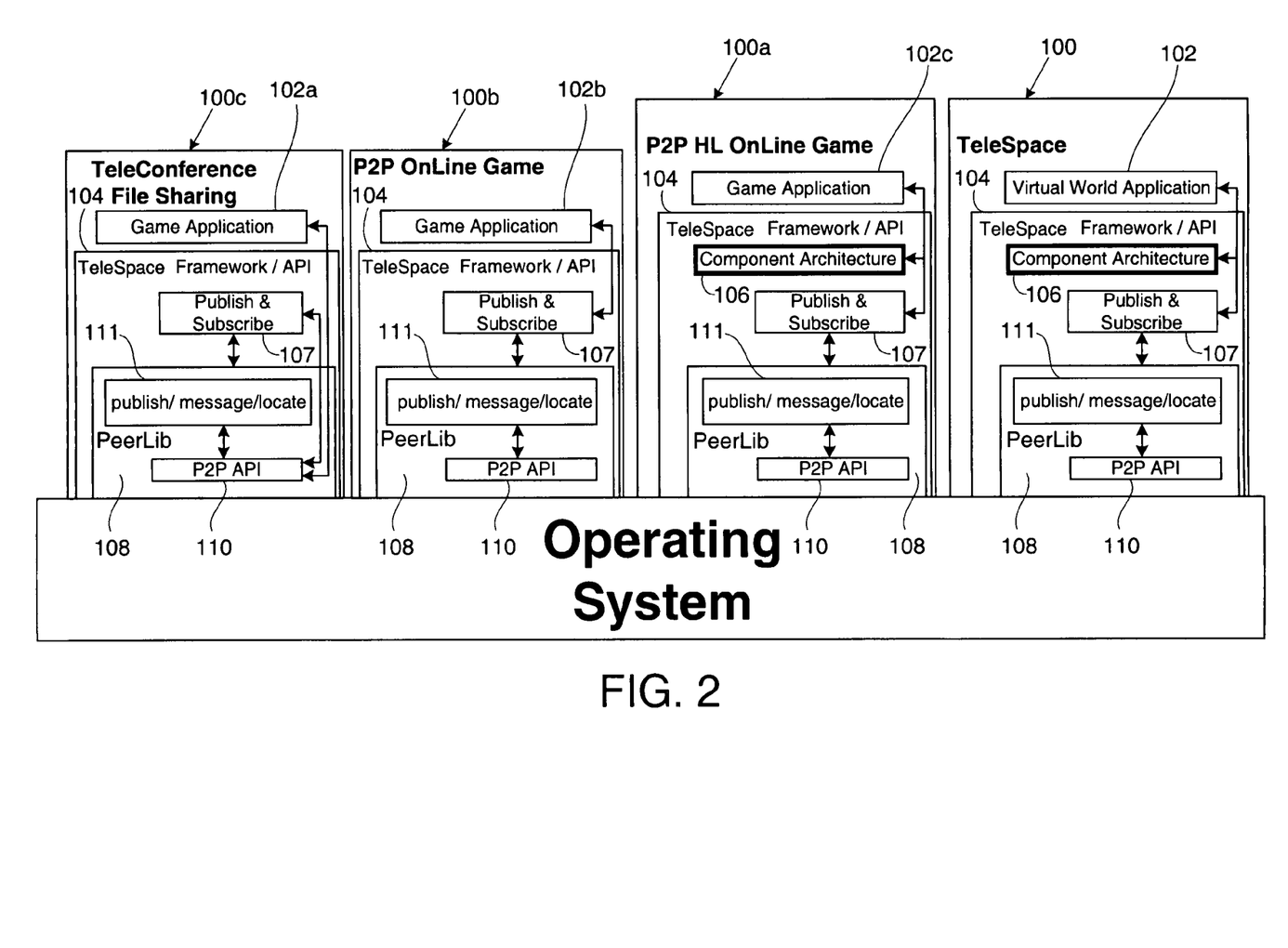
FIG. 2 illustrates examples of the telespace framework, in which applications utilize components to define applications and a PeerLib enables communication with grids of the peer-to-peer network of the present invention.

In the peer-to-peer environment of the telespace component 100, the applications are defined by component blocks of the component architecture 106. Depending on the application, certain component blocks will be needed from peers of the peer-to-peer grid to define the application's functionally. The telespace framework API 104 will further include a publish and subscribe (P&S) component 107. The P&S component 107 is in communication with a peer library (PeerLib) component 108. PeerLib component 108 includes a publish/message/locate (PML) component 111 and a peer-to-peer (P2P) API 110. The P2P API 110 will be described in more detail below, and is defined as networker 302.

The P&S component 107 is charged with publishing attributes of the component blocks (i.e., objects) that are part of the component architecture 106. In this manner, other peers that are connected to the grid overlay will know what attributes of the component blocks may be available to be shared. The P&S component 107 is also charged with subscribing. The function of subscribing enables messages to be sent to other published objects on the grid overlay. Thus, peers can publish that they hold objects that can be shared with other peers on the grid overlay, and peers can subscribe to information and status from objects that are already published on the grid overlay. The component blocks of the component architecture 106 will therefore be able to publish attributes and subscribe to attributes of components on the grid overlay using the P&S component 107.

P&S component 107 is message based (e.g., hierarchical ASCII, binary, XML like, etc.). The physical representation is independent of data transfer solution for inter-component communication. Thus, P&S mechanism is optimized for given computer architectures, and optimized for network transfer. Thus, in one embodiment, data is only sent if subscribed. Thus, the P&S component 107 is responsible for tracking subscriptions requests and distributing the publishable attributes, based on instructions from the source component (e.g., after execution, flag change, etc.), and based on requests from other components including remotely replicated components. The P&S component 107 is further responsible for the delivery of subscribed data. Examples include message queue handling, parent calling (e.g., get next message), automatic data placement (with or without notification), semi-automatic placement, etc.

The PML component 111, on the other hand, is charged with publishing objects themselves, messaging, and locating objects to and from the grid overlay. In addition to publishing objects, the publish code of the PML component 111 will also handle the publishing of attributes for the P&S component 107. Thus, PeerLib component 108 is responsible for obtaining the component blocks (i.e., objects) through the P2P API 110, in response to the needs of the application. As noted above, the applications running on a particular peer are composed of component blocks which are managed by the component architecture 106. The application will then access the component blocks to form a functional application. Thus, depending on the desired application, the component blocks are obtained over the grid overlay by the PML component 111 of the PeerLib 108.

Since these component blocks are shared over the grid overlay, as peers join a grid overlay or leave a grid overlay, the component blocks may be migrated to other connected peers. In this manner, peers needing the functionality of a particular component block can obtain the component block or access the component block from another peer that publishes the component's availability.

Still referring to FIG. 2, applications 102a and 102b utilize applications that may not require the component architecture 106. For instance, the connectivity application 102a can simply exchange messages (e.g., that contain simple data or files) to and from the grid through the P2P API 100. Thus, no components are needed to operate the connectivity application 102a, which may be used for teleconferencing or file sharing. No component blocks of architecture 106 are needed for the game application 102b, which simply uses messaging communication to interact with a peer-to-peer online game. In game application 102c, however, this game application will require certain components to enable the functionality on the local peer. For this reason, the component architecture 106 will request and obtain the necessary component blocks needed to operate a functional game application 102c. Consequently, it will be understood that any type of application can be processed in the peer-to-peer environment defined by grids that form a telespace. The telespace is therefore defined in a broad sense in terms of a virtual world, and in more specific subsets of selected interest spaces. The peer architecture is therefore defined as a decentralized self-organizing scalable grid of peers for routing messages and exchanging data.

Figure 3:
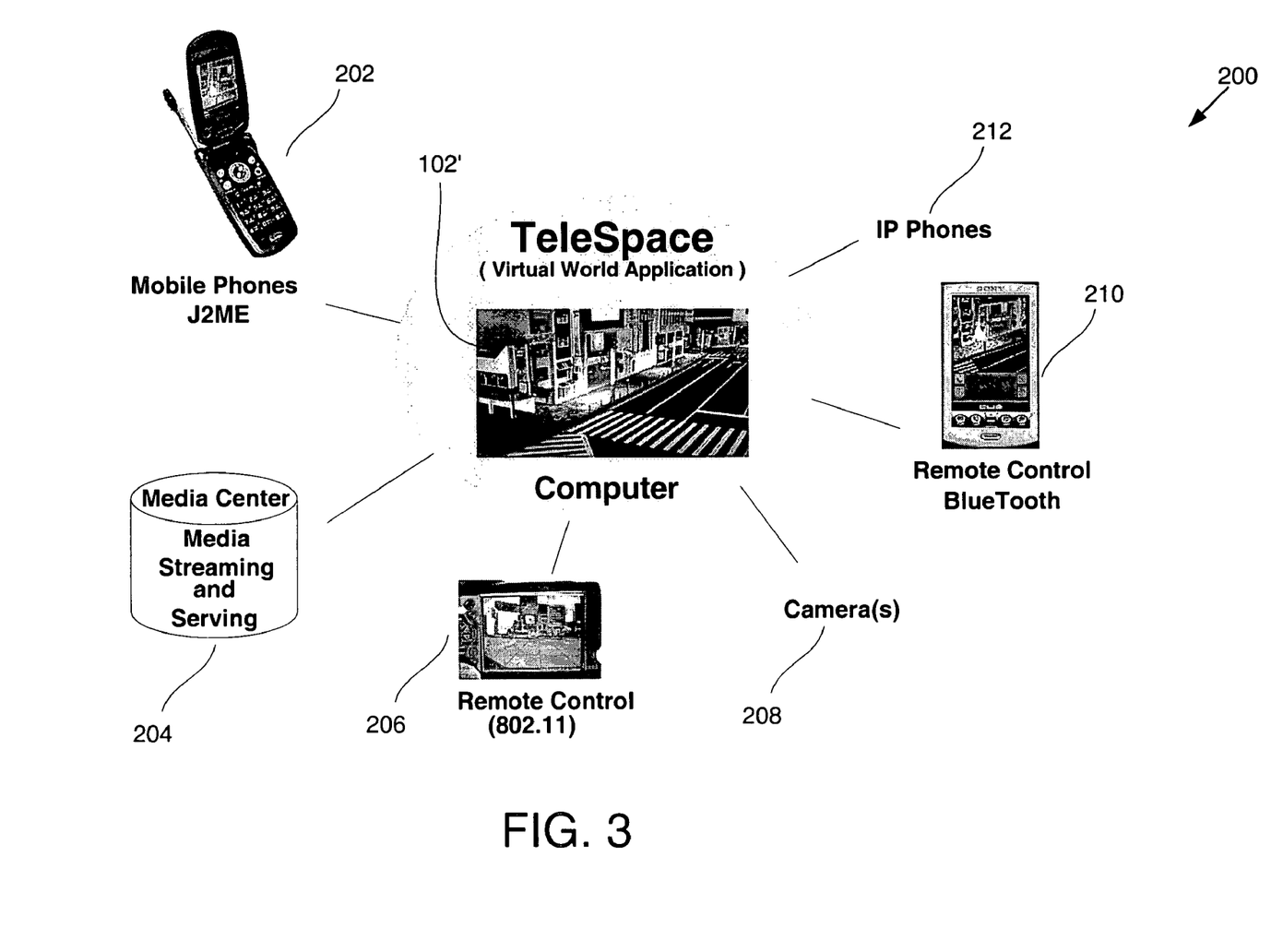
FIG. 3 is a graphical representation of a telespace, which is shown connected to a virtual world application, which is running on a peer computer, in accordance with one embodiment of the present invention.

FIG. 3 is a graphical representation of a telespace 200, which is shown connected to a virtual world application 102', which is running on a peer computer. The virtual world application 102' shows an example picture of a city street. The city street may be the home town street of a peer user, and in that city street, the user may need to access certain sources. Through the telespace 200, the peer user will be able to communicate or access various devices, such as mobile phones 202, media 204, remote control (e.g., 802.11) devices 206, camera(s) 208, PDA devices 210, IP phones, etc. The contestability to different types of sources is literally limitless, so long as the sources are made available to the grid. However, the types of sources available in a particular grid overlay will depend on the type of interest space included in the grid overlay.

Figure 4:
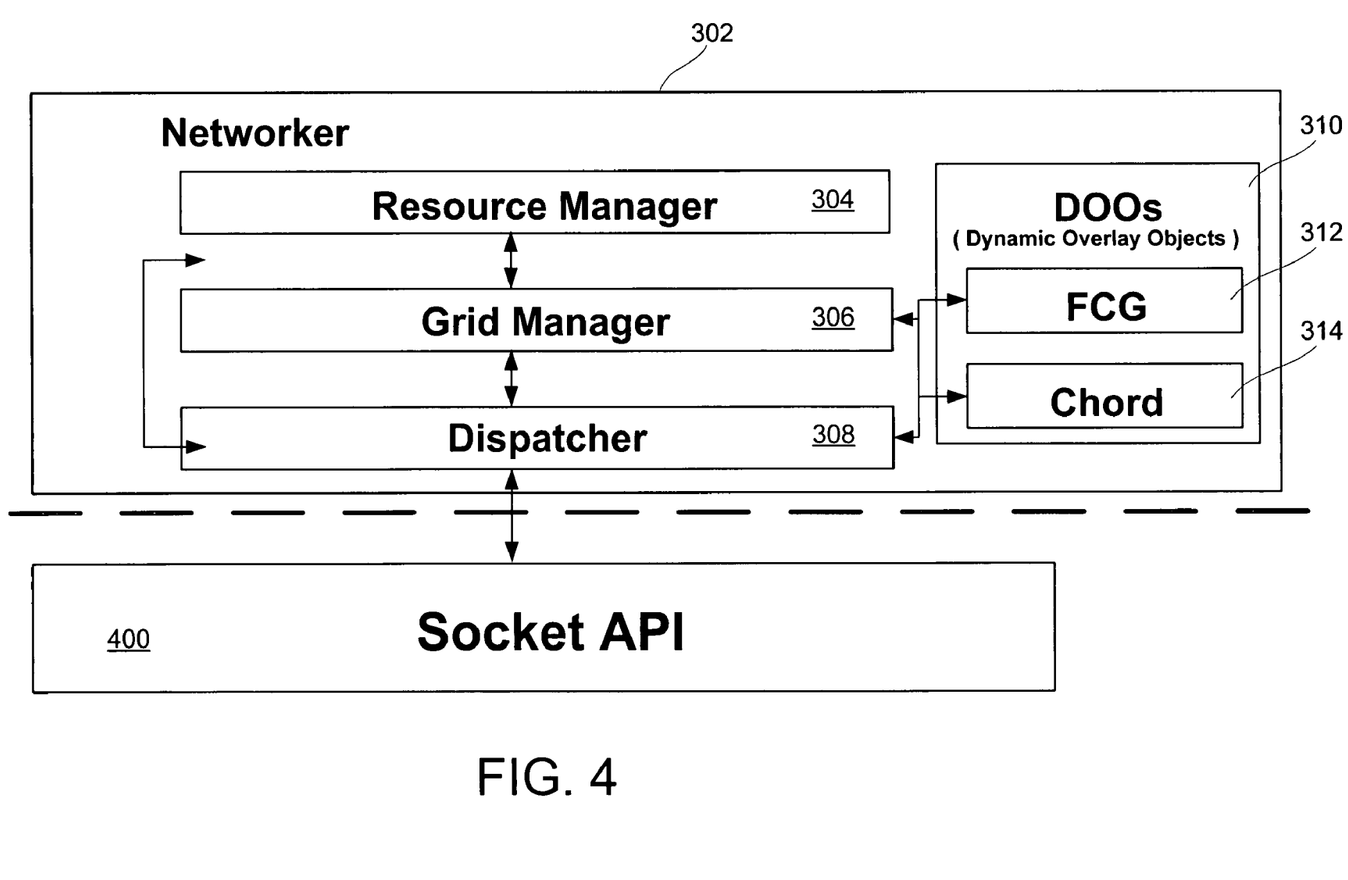
FIG. 4 illustrates a networker component of the PeerLib, in accordance with one embodiment of the present invention.

FIG. 4 illustrates a networker component 302, which is analogous to the P2P API 110 of FIGS. 1 and 2 above. The networker component 302 is an application programming interface (API) that is charged with handling communication to and from the grid overlay for a peer, in the P2P network of the present invention. Networker component 302 includes a resource manager 304, a grid manager 306, a dispatcher 308, and dynamic overlay objects (DOO) 310. DOO includes a fully connected graph (FGC) 312 component and a Chord 314 component. The basic functionality of FCG 312 and Chord 314, by themselves, is well known to those skilled in the art. However, the manner in which they are arranged as part of networker component 302 provides efficiencies and comprehensive integration within PeerLib 108. For clarity, it will be understood that networker component 302 provides the functionality identified as P2P API 112, which is part of PeerLib 108, as shown in FIGS. 1 and 2.

The resource manager 304 is configured to manage the accessibility to and from published objects on the grid overlay network of peers. For instance, peers can send requests to the grid for resources. Once a resource is found on one or more peers of the grid, the requesting peer can then either download the resource or request that the resource be streamed to the requesting peer. Thus, peers will use the resource manager 304 to publish its resources that it can share, and peers can request the location of resources for subsequent access.

The grid manager 306 is configured to communicate with the DOO 310. The DOO 310 will provide the services to connect the requesting peer to the appropriate grid interconnection topology. Thus, depending on the grid that the application running on the peer desires to join or create, the grid manager 306 will select and load the appropriate overlay using the DOO 310. Once the peer joins or creates a grid overlay, the peer can receive or communicate messages from and to the other peers connected to the grid.

The dispatcher 308 is charged with dispatching messages for published objects that want to receive messages. Published objects that want to receive messages are published with a message handler. Thus, when messages come in from the grid and arrive at a peer, the messages come in to the dispatcher 308. If the message is not for the receiving peer, the dispatcher will pass the message onto Chord 314 or FCG 312, which in turn will pass the message on to another peer. As peer-to-peer networks are defined by a group of participants of a grid, the message can be passed on through the chain until the message arrives to the intended peer. In addition to passing on the messages to the immediate neighbor peer, the messages can be passed on to other peers using entry points, though a FCG connection. However, if the message is for the peer, instead of passing the message on to another peer, the message can be passed up to the application of the peer.

The mechanisms to find entry points in the telespace can include, for example, hub peers (for predefined entry point servers), multi-layered broadcast/hop-ring multicast, manual specifications, random tail, etc.

Still referring to FIG. 4, the networker component 302 is also shown connected to a socket API 400. The socket API 400 is part of the operating system 114 of FIGS. 1 and 2 above. Thus, networker component 302 provides the interface to the grid for peers, which allows peers to function in a virtual world application, which is defined by peers (and their shared resources). The componentization of applications therefore enables efficient resource sharing within a grid, and the networker component 302 provides the efficient communication power necessary to handle the publishing, subscribing, messaging and locating necessary to function in a connected grid of the present invention.

Figure 5:
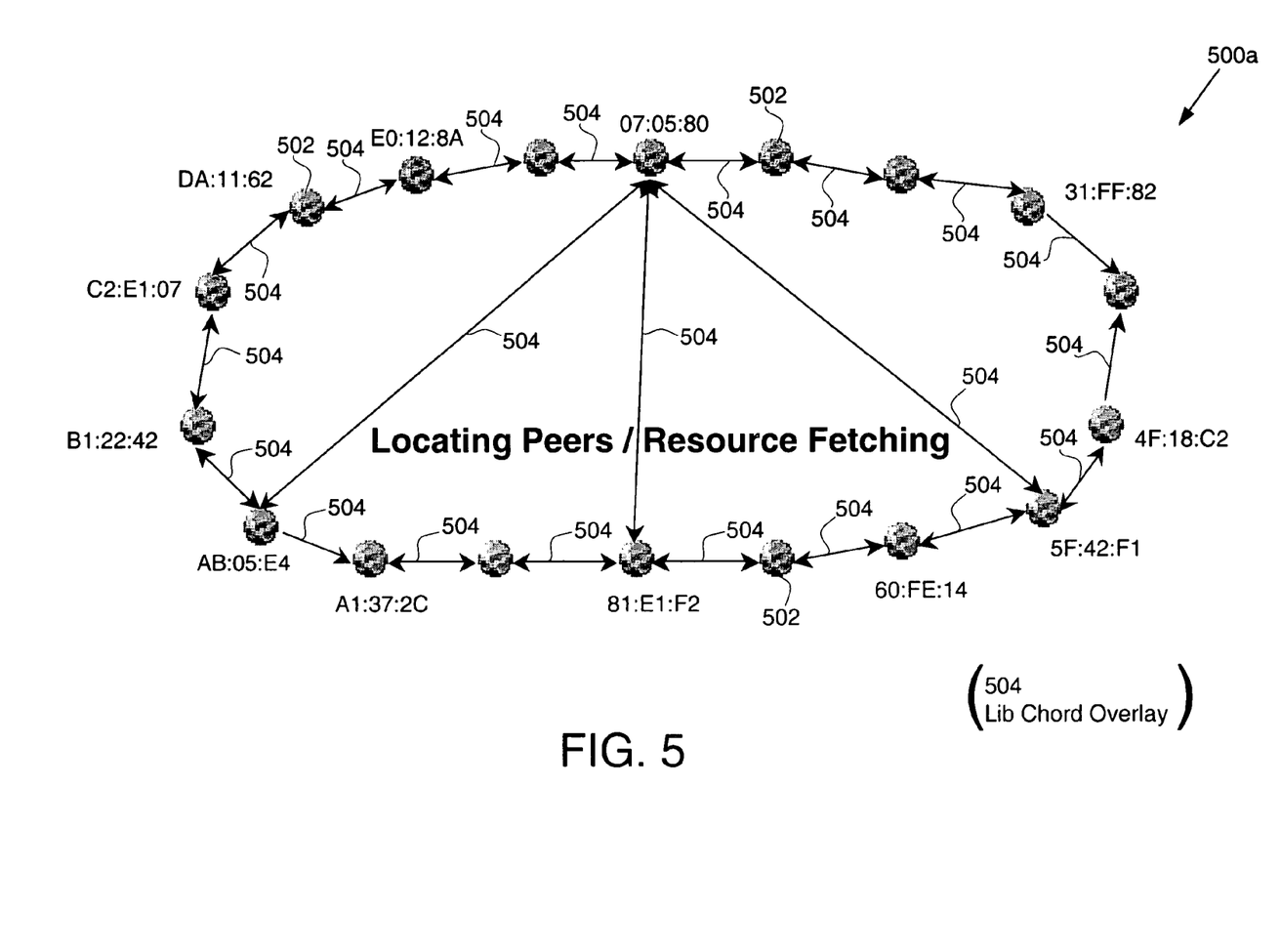
FIGS. 5 through 7 illustrate examples of a number of peers connected to a grid overlay, in accordance with one embodiment of the present invention.
Figure 6:
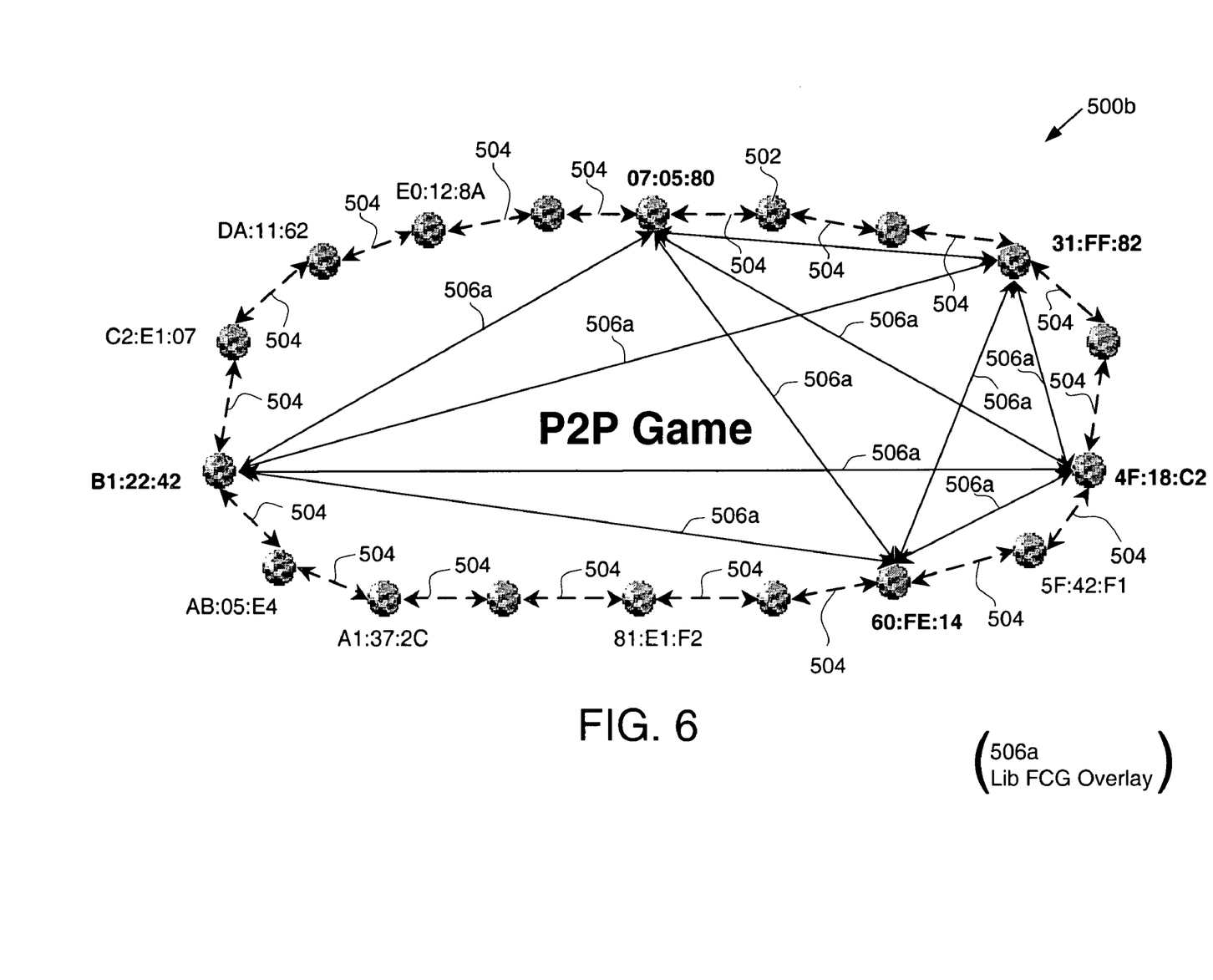
Figure 7:
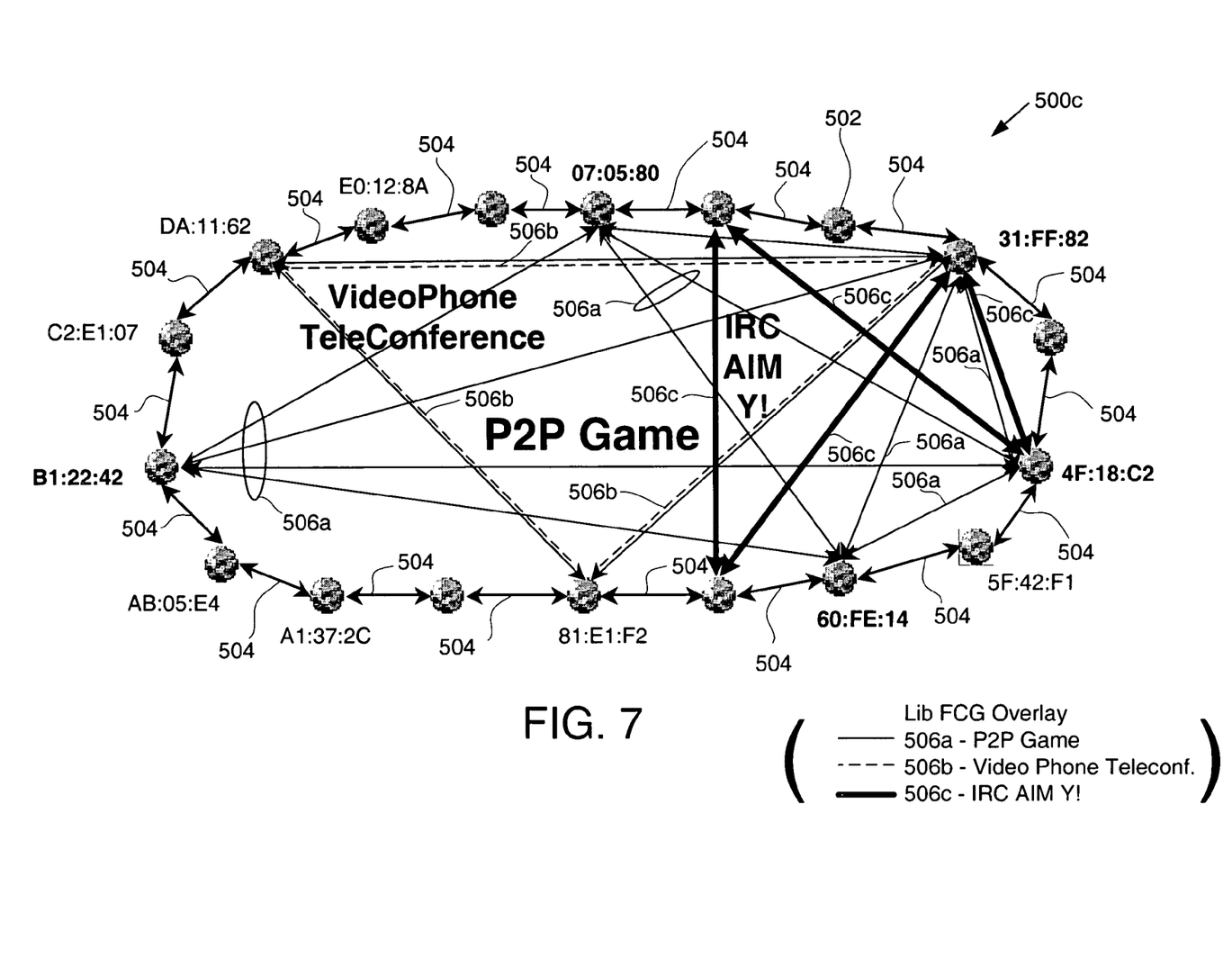

FIGS. 5 through 7 illustrate examples of a number of peers 502 connected to a grid overlay. In a grid 500a of FIG. 5, the peers 502 are shown connected by links 504, in accordance with the "chord" definition. Thus, links 504 going clockwise define successor connections between the peers 502 and the links 504 going counter-clockwise define predecessor connections. The links 504 in the center define finger table connections. In this example, peers are able to locate other peers and fetch needed resources from the grid. For each peer, device Ids, in hexadecimal notation define the individual peers, and the hexadecimal numbers increase in the clockwise direction.

In grid 500b of FIG. 6, the peers 502 continue to be interconnected by chord as defined above, but in addition, fully connected grid (FCG) connections are added. The FCG connections 506a define connections used by peers 502 of the grid 500b to play a game (i.e., a P2P game). As games require less latency to efficiently play and allow interaction, the FCG connections provide this additional overlay, which is provided by the DOO 310 of FIG. 4.

In the grid 500c of FIG. 7, the peers 502 are still connected by chord, but also include several other FCG connections. In this example, a low latency requiring connection is shown for video phone conferencing, and defined by connections 506b. Further added is an instant messaging chat session (e.g., Yahoo's IRC AIM). In this grid 500c, therefore, the peers are able to establish a connection with the grid and particular other pees, share components with other peers, and message with other peers.

As an overview, a virtual world application is provided to allow for controlled data exchange between connected platforms of a peer-to-peer grid. The virtual world application is also referred to herein as a "TeleSpace." As an example, the virtual world application provides common interfaces and operating conventions. In one embodiment, the common interfaces and operating conventions provide an API for controlled data exchange between connected platforms. The API and associated framework allow creation of distributed scenegraph-type applications. The virtual world application is based on a software infrastructure that is adaptable and quickly modifiable as needed to use and communicate with component-based inter-network applications. The virtual world application is designed for high performance and scalability to numerous applications, platforms, users, entities, and databases.

Peer-to-peer networks are decentralized computing systems made up of peers, which define nodes of the network. In some exemplary embodiments, a peer can include any computing device, such as a desktop-class computer, a server-class computer, a mobile device, a hand-held device, a cell phone, a PDA, a game machine, a game console, etc. However, in other embodiments, the peer can be a computing device that is capable of establishing communication with another computing device, as long as the computing devices are connected to the P2P network.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An interconnectivity framework for communicating in a peer-to-peer network, a peer of the interconnectivity framework comprising:
    a peer library for publishing, messaging and locating component blocks over the peer-to-peer network; and
    a telespace framework for managing component blocks in response to a requirement of an application to be executed at the peer, the component blocks being obtained by the peer library enable execution of the application at the peer in accordance with the requirement.

2. An interconnectivity framework for communicating in a peer-to-peer network as recited in claim 1, wherein one or more component blocks define an object.

3. An interconnectivity framework for communicating in a peer-to-peer network as recited in claim 1, wherein aggregated component blocks define an entity.

4. An interconnectivity framework for communicating in a peer-to-peer network as recited in claim 2, wherein the telespace framework further comprises:
    a publish and subscribe component, the publish and subscribe component is configured to notify peers of the peer-to-peer grid regarding availability of certain objects at the peer and request status notifications from objects of other peers on the grid.

5. An interconnectivity framework for communicating in a peer-to-peer network as recited in claim 1, wherein the peer library includes a networker component to enable the peer to communicate with peers of selected grids of the peer-to-peer network.

6. An interconnectivity framework for communicating in a peer-to-peer network as recited in claim 5, wherein the networker component further includes,
    a resource manager for publishing resources of the peer to other peers of the peer-to-peer network and for obtaining objects from the other peers of the peer-to-peer network;
    a grid manager to create or join specific grids of the peer-to-peer network; and
    a dispatcher for receiving messages at the peer from the peer-to-peer network.

7. An interconnectivity framework for communicating in a peer-to-peer network as recited in claim 6, wherein the dispatcher is configured to communicate the received messages to the application or pass the messages to another peer.

8. An interconnectivity framework for communicating in a peer-to-peer network as recited in claim 6, wherein the networker component further includes a dynamic overlay objects component.

9. An interconnectivity framework for communicating in a peer-to-peer network as recited in claim 8, wherein the dynamic overlay objects component includes a fully connected graph component and a chord component for establishing grid overlays in the peer-to-peer network.

10. A networker component for facilitating an application programming interface (API) of a peer in peer-to-peer network, the networker component comprising:
    a resource manager for publishing resources of the peer to other peers of the peer-to-peer network and for obtaining objects from the other peers of the peer-to-peer network for an application;
    a grid manager to create or join specific grids of the peer-to-peer network;
    a dispatcher for receiving messages at the peer from the peer-to-peer network; and
    a dynamic overlay objects (DOO) component for creating the specific grids in response to instructions from the grid manager.

11. A networker component for facilitating an application programming interface (API) of a peer in peer-to-peer network as recited in claim 10, wherein the dispatcher is configured to communicate the received messages to the application or pass the messages to another peer.

12. A networker component for facilitating an application programming interface (API) of a peer in peer-to-peer network as recited in claim 10, wherein the dynamic overlay objects component includes a fully connected graph component and a chord component for establishing grid overlays in the peer-to-peer network.

13. A networker component for facilitating an application programming interface (API) of a peer in peer-to-peer network as recited in claim 10, wherein the application identifies attributes that dictate particular objects needed to complete functionality of the application, the application being capable of manipulating the objects to execute the application over the peer-to-peer network.

14. A networker component for facilitating an application programming interface (API) of a peer in peer-to-peer network as recited in claim 13, wherein the objects are defined by one or more component blocks, and aggregated component blocks define an entity to be utilized by the application of the peer.

15. A networker component for facilitating an application programming interface (API) of a peer in peer-to-peer network as recited in claim 10, wherein the networker component communicates with a socket API of an operating system of the peer.

16. A networker component for facilitating an application programming interface (API) of a peer in peer-to-peer network as recited in claim 10, wherein the application defines a filtering that establishes an interest space for peers, the interest space for peers includes a subset of peers that share or exchange messages or both messages and component blocks related to the application.

17. A method for executing an application at a peer having a telespace framework that is connected to a peer-to-peer network, comprising:
    defining a peer library for publishing, messaging and locating component blocks over the peer-to-peer network; and
    defining a telespace framework for managing component blocks in response to a requirement of an application to be executed at the peer, the component blocks being obtained by the peer library to enable execution of the application at the peer in accordance with the requirement.

18. A method for executing an application at a peer having a telespace framework that is connected to a peer-to-peer network as recited in claim 17, wherein the requirement of the application defines a type of application.

19. A method for executing an application at a peer having a telespace framework that is connected to a peer-to-peer network as recited in claim 17, the method further comprises:
    executing a publish and subscribe component, the publish and subscribe component is configured to notify peers of the peer-to-peer grid regarding availability of certain objects at the peer and request status notifications from objects of other peers on the grid.

20. A method for executing an application at a peer having a telespace framework that is connected to a peer-to-peer network as recited in claim 17, wherein the peer library includes a networker component for enabling the peer to communicate with peers of selected grids of the peer-to-peer network.

21. A method for executing an application at a peer having a telespace framework that is connected to a peer-to-peer network as recited in claim 17, wherein the networker component includes,
   - a resource manager for publishing resources of the peer to other peers of the peer-to-peer network and for obtaining objects from the other peers of the peer-to-peer network;
   - a grid manager to create or join specific grids of the peer-to-peer network; and
   - a dispatcher for receiving messages at the peer from the peer-to-peer network.

22. A computer readable media including program instructions for executing an application at a peer having a telespace framework that is connected to a peer-to-peer network, the computer readable media comprising:
   - program instructions for defining a peer library for publishing, messaging and locating component blocks over the peer-to-peer network; and
   - program instructions for defining a telespace framework for managing component blocks in response to a requirement of an application to be executed at the peer, the component blocks being obtained by the peer library to enable execution of the application at the peer in accordance with the requirement.

23. A computer readable media as recited in claim 22, wherein the requirement of the application defines a type of application.

24. A computer readable media as recited in claim 22, the computer readable media further comprising:
   - program instructions for executing a publish and subscribe component, the publish and subscribe component is configured to notify peers of the peer-to-peer grid regarding availability of certain objects at the peer and request status notifications from objects of other peers on the grid.

25. An interconnectivity framework for communicating in a peer-to-peer network, a peer of the interconnectivity framework comprising:
   - a peer library means for publishing, messaging and locating component blocks over the peer-to-peer network; and
   - a framework means for managing component blocks in response to a requirement of an application to be executed at the peer, the component blocks being obtained by the peer library means to enable execution of the application at the peer in accordance with the requirement.

26. An interconnectivity framework as recited in claim 25, wherein one or more component blocks define an object.

27. An interconnectivity framework as recited in claim 25, wherein aggregated component blocks define an entity.

28. An interconnectivity framework as recited in claim 26, wherein the framework means further comprises:
   - a publishing and subscribing means, for notifying peers of the peer-to-peer grid regarding availability of certain objects at the peer and requesting status notifications from objects of other peers on the grid.

29. An interconnectivity framework as recited in claim 25, wherein the peer library means includes a networker means to enable the peer to communicate with peers of selected grids of the peer-to-peer network.

30. An interconnectivity framework as recited in claim 29, wherein the networker means further includes,
   - a resource managing means for publishing resources of the peer to other peers of the peer-to-peer network and for obtaining objects from the other peers of the peer-to-peer network;
   - a grid managing means to create or join specific grids of the peer-to-peer network; and
   - a dispatching means for receiving messages at the peer from the peer-to-peer network.

* * * * *